Patented Apr. 23, 1929.

1,710,255

UNITED STATES PATENT OFFICE.

PAUL GLOESS, OF ST.-MANDE, FRANCE.

PROCESS FOR OBTAINING ORGANIC IODINE.

No Drawing.   Application filed July 2, 1927.   Serial No. 203,270.

Sea-weeds and particularly those belonging to the "brown seaweeds" (Phæophyceæ), more especially the "Laminariaceæ", contain a series of substances presenting remarkable properties, some of them for medicinal and hygienic purposes and others for industrial purposes.

Some of these weeds have already been used for extracting therefrom iodine, potash salts and mucilaginous matter they contain.

But by extracting iodine from these weeds, it has not been possible, up to now, to extract iodine from the latter under its natural form, that is to say the form under which it is combined in these weeds.

The processes for extracting iodine from weeds such as they have been carried out, up to this day, have simply been intended to extract iodine from weeds under its form of element, viz: metalloïdic iodine.

In these processes, the combination, in which iodine is naturally found in the weeds, is not maintained intact, but is even destroyed in order to be able of better separating iodine under its form of element which, up to now, was the only one considered as starting point for the preparation of artificial combinations of iodine under the most various forms.

Now it is precisely the natural combination of iodine in the weeds which presents remarkable properties, much exceeding, by its great activity, the properties of the artificial combinations of iodine.

Besides the natural combination of iodine extracted from the thyroïdian-gland, no other natural combination of iodine (combination containing dosable iodine) has been, up to now, used for medical purposes; and yet the products containing iodine, extracted from the thyroïdian-gland must only be employed, as is well known, with great caution, owing to the toxic effects caused, in certain cases by these iodine products of animal origin.

The natural combination of iodine extracted from sea-weeds is the first combination of vegetal origin proposed, up to this day, for use in medical purposes and if it is considered that sea-weeds have been the first manifestation of life on the earth, it is beyond doubt that this natural iodine combination of sea-weeds represents the iodine combination of origin of life.

This iodine combination, rigorously dosed, is, preferably, separated from the other materials which accompany it in the sea-weeds, in order to be used for medical purposes, under a form soluble in water, for internal use, to be taken by the mouth or by subcutaneous injections, whilst for external use and particularly for use under the form of baths, the iodine-substance is not, preferably, completely separated from the other materials which accompany it in the sea-weeds, but is still united with the mineral salts and with the other substances soluble in water.

For extracting the iodine-matter from sea-weeds, whilst maintaining it in its natural unaltered condition, it is necessary:

1°—to treat dry sea-weeds, either sea-weeds dried in the open air, or, if artificially dried, dried at a low temperature, in order to avoid any alteration by the heat.

In dry sea-weeds, the substances soluble in water are, in fact, in a dry condition, whilst in fresh sea-weeds, these substances are dissolved, diluted in water.

It results from this fact that by washing fresh sea-weeds with water, it is only possible to obtain diluted solutions, which are costly to evaporate and which in course of evaporation are liable to become altered, whilst by washing dry sea-weeds, it is possible to obtain, at will, concentrated solutions and even saturated solutions.

2°—to wash, to exhaust the sea-weeds with water, in a continuous manner, by causing water to circulate in reverse direction to the weeds, viz: by bringing the water of the first phase, not yet loaded with substances, first in contact with the most exhausted weeds of the last phase, then in bringing the exhausting water of the second phase in contact with the weeds of the last phase but one, and so on, until the exhausting water of the last phase, the most concentrated, has left the weeds of the first phase which have the highest content in substances to be dissolved.

By thus washing sea-weeds, on the counter-current principle, it is possible to directly obtain, without other operation, on the one hand, concentrated solutions of the materials soluble in water, and, on the other hand, sea-weeds well exhausted.

3°—to press out the sea-weeds during their washing with water and this immediately after each contact with water, that is to say, after each phase of maceration in water.

In fact, sea-weeds contain a mucilaginous substance which swells enormously in water and forms very viscous solutions, which would prevent the suitable exhaustion of the other materials, soluble in water, contained in the weeds, if this swelling was not rendered impossible precisely by the immediate pressing out of the exhausting water after each maceration.

It is necessary that the mucilaginous substance should not have the time to dissolve in water, but that after each imbibition it should be immediately pressed out.

By causing each maceration to be immediately followed by the pressing out of the weeds, for separating the exhausting water therefrom, the swelling of the mucilaginous substance is not only prevented, but, at the same time, the weeds are exhausted in a better manner and more rapidly.

Considering the difference of permeability of the walls of the cells of the weeds for the different substances they contain and considering the difference of speed of diffusion of these substances, the mucilaginous matter contained in the weeds has thus not the time to absorb water, being always again separated from the same at the very time it might enter in action, which might otherwise be feared, particularly towards the end of the exhausting operation, when the water becomes purer and purer, that is to say when the water is less and less charged with salts and from this fact opposes itself to a lesser extent to the swelling of the mucilaginous substance.

The sea-weeds thus exhausted and pressed out give:

1°—exhausting solutions the most concentrated possible and

2°—exhausted sea-weeds containing but a relatively small amount of water and which from this fact can be easily and economically dried.

1°—The solution resulting from the exhaustion of the sea-weeds contains the natural iodine-substance of the latter, accompanied by mineral salts and other substances soluble in water which accompany it in the weeds.

This solution is employed for external use, preferably, as such, or after it has been converted into a solid substance, by evaporation in vacuum, or by crystallization with suitable anhydrous substances.

For separating the iodine-substance from this liquid of exhaustion of the weeds, it is preferably treated with a lead-salt or with a cuprous-salt, which forms with the iodine-substance a combination insoluble in water.

The precipitated iodine-substance is subsequently separated from the lead or from the copper, by treating the precipitate with iron filings which solublizes the iodine-substance by transforming it into its iron-salt, which latter, in its turn can be converted, by precipitation of the iron, by carbonate of soda, into its sodium-salt.

The solution of the iodine-substance thus obtained, completely freed from any foreign matters, is employed, for internal use, to be taken by the mouth or by sub-cutaneous injections, preferably as such, or after it has been transformed into a solid substance, by evaporation in vacuum, or by crystallization with suitable anhydrous substances.

The liquid of exhaustion of the weeds, after precipitation of the iodine-substance, that is to say the liquid still containing potassic mineral-salts, besides other soluble substances of the weeds, is, preferably, used as fertilizer and this as such, or after it has been evaporated, in a dry condition.

2°—The exhausted weeds contain on the other hand the mucilaginous substance contained in the weeds accompanied by cellulose and mineral-salts, insoluble in water.

For purifying this mucilaginous substance, that is to say for separating it from the cellulose and from the mineral-salts, insoluble in water, it is solubilized, preferably by a solution of an alkali-carbonate, or by carbonate of soda, which, as is known, dissolves the mucilaginous substance and leaves the cellulose and mineral-salts undissolved as residue. The mucilaginous substance dissolved is subsequently precipitated by a mineral-acid and is finally dried.

This separation of the mucilaginous substance is, however, in numerous cases unnecessary, according to the use which must be subsequently made of the mucilaginous substance and which includes the most varied applications, based on the eminently colloïdal power and the great viscosity of this substance and of its derivatives:

Agglutinative substances for the production of agglomerates of coal and other fuels, as well as of agglomerates of building materials and agglomerates of other matters; glues and dressings for the textile and paper-making industries; thickening substances for printing purposes; emulsifying substances for the most varied uses; flocculent substances for the clarification of liquids; disincrustants for boilers; anti-cryptogamic-substances for vine, wheat and other cultures; submarine- and like-paints; plastifying-substances and coating for cement-works; coverings for fish and other goods, injured by contact with the air; artificial silk, photographic-films and bands, kinematographic-films.

Whilst some of these applications only necessitate a raw, nonpurified mucilaginous substance, some others of these applications necessitate, on the contrary, not only a mucilaginous substance separated by precipitation, but even additionally purified, freed from the smallest traces of foreign materials and completely discolored.

I claim:—

1. In the art of recovering an organic oidine from seaweeds in the form of its sodium salt, the method which consists in repeatedly leaching the seaweeds with water, following each washing with a pressing of the sea-weeds sufficiently rapid so as not to give the sea-weeds time to absorb water and swell, precipitating from the resulting iodine containing water by means of copper or lead salts an iodine containing organic substance, treating the precipitate therefrom with iron filings to form an iron salt and treating said iron salt with sodium carbonate to form an iodine-sodium salt.

2. In the art of recovering an organic iodine from seaweeds, the method which consists in repeatedly leaching dry seaweed with water and pressing the same after each leaching sufficiently rapid to prevent the seaweeds from absorbing water and continuing the alternate washings and pressings until there is obtained a strong solution of iodine containing organic substances, separating said substances from the weeds by precipitation with lead or cupreous salts, thereby forming a substance insoluble in water, treating said substances with a ferreous reagent and precipitating the iron by sodium carbonate thereby to form the iodine as its sodium salt.

3. In the art of recovering an organic iodine from seaweeds, the method which consists in repeatedly leaching dry seaweed with water and pressing the same after each leaching sufficiently rapid to prevent the seaweeds from absorbing water and continuing the alternate washings and pressings until there is obtained a strong solution of iodine containing organic substances, separating said substances from the weeds by precipitation with lead or cupreous salts, thereby forming a substance insoluble in water, treating said substance with a ferreous reagent and precipitating the iron by sodium carbonate thereby to form the iodine as its sodium salt, and drying the resulting sodium salt under vacuum.

4. In the art of forming a sodium iodine salt, the method which consists in leaching out of dry sea-weeds certain of its constituents including iodine, precipitating from the resulting product the contained organic iodine by treatment with iron filings and then treating the same with a soluble sodium salt.

The foregoing specification of my "medical, hygienic and industrial products simultaneously extracted from sea-weeds and process for obtaining these products" signed by me this 10th day of June, 1927.

PAUL GLOESS.